United States Patent [19]

Nagata et al.

[11] Patent Number: 5,796,092
[45] Date of Patent: Aug. 18, 1998

[54] IC CARD AND IC CARD SYSTEM

[75] Inventors: Noriharu Nagata, Sanda; Hidenobu Gochi, Itami, both of Japan

[73] Assignee: Mitsubishi Denki Kabushiki Kaisha, Tokyo, Japan

[21] Appl. No.: 532,498

[22] Filed: Sep. 22, 1995

[30] Foreign Application Priority Data

Sep. 29, 1994 [JP] Japan .................... 6-235273

[51] Int. Cl.$^6$ .................... G06K 19/06; G06K 5/00
[52] U.S. Cl. .................... 235/492; 235/380
[58] Field of Search .................... 235/492, 380, 235/375; 380/25; 340/825.31; 395/800

[56] References Cited

U.S. PATENT DOCUMENTS

| | | | |
|---|---|---|---|
| 4,650,975 | 3/1987 | Kitchener | 235/380 |
| 4,672,182 | 6/1987 | Hirokawa | 235/492 |
| 4,837,422 | 6/1989 | Dethloff et al. | 235/380 |
| 5,365,047 | 11/1994 | Yamaguchi | 235/492 X |
| 5,367,149 | 11/1994 | Takahira | 235/492 X |
| 5,396,056 | 3/1995 | Yamaguchi | 235/492 |
| 5,408,082 | 4/1995 | Takagi et al. | 235/492 |
| 5,428,685 | 6/1995 | Kadooka et al. | 380/25 |
| 5,442,165 | 8/1995 | Atsumi et al. | 235/492 |
| 5,444,222 | 8/1995 | Inoue | 235/492 X |
| 5,506,397 | 4/1996 | Hoshino | 235/492 |
| 5,579,502 | 11/1996 | Konishi et al. | 235/492 X |

*Primary Examiner*—Donald T. Hajec
*Assistant Examiner*—Thien Minh Le
*Attorney, Agent, or Firm*—Leydig, Voit & Mayer, Ltd.

[57] ABSTRACT

An IC card includes a first auxiliary read-only memory containing identification data and a second auxiliary read/write memory. Under control of a host system, a write operation is performed into both the first and second auxiliary memories and only the data in the second auxiliary memory is updated. The host system reads the data from each of the first and second auxiliary memories and a data matching block in the host system checks each of the data against the data in a memory in the host system. Access to the main memory of the IC card is authorized only when the checking results in a match.

14 Claims, 7 Drawing Sheets

IC CARD AND IC CARD SYSTEM

BACKGROUND OF THE INVENTION

1. Field of the Invention

The present invention relates to an IC card and an IC card system in which unauthorized or unlawful use of the IC card is prevented.

2. Description of the Related Art

Figure 7:
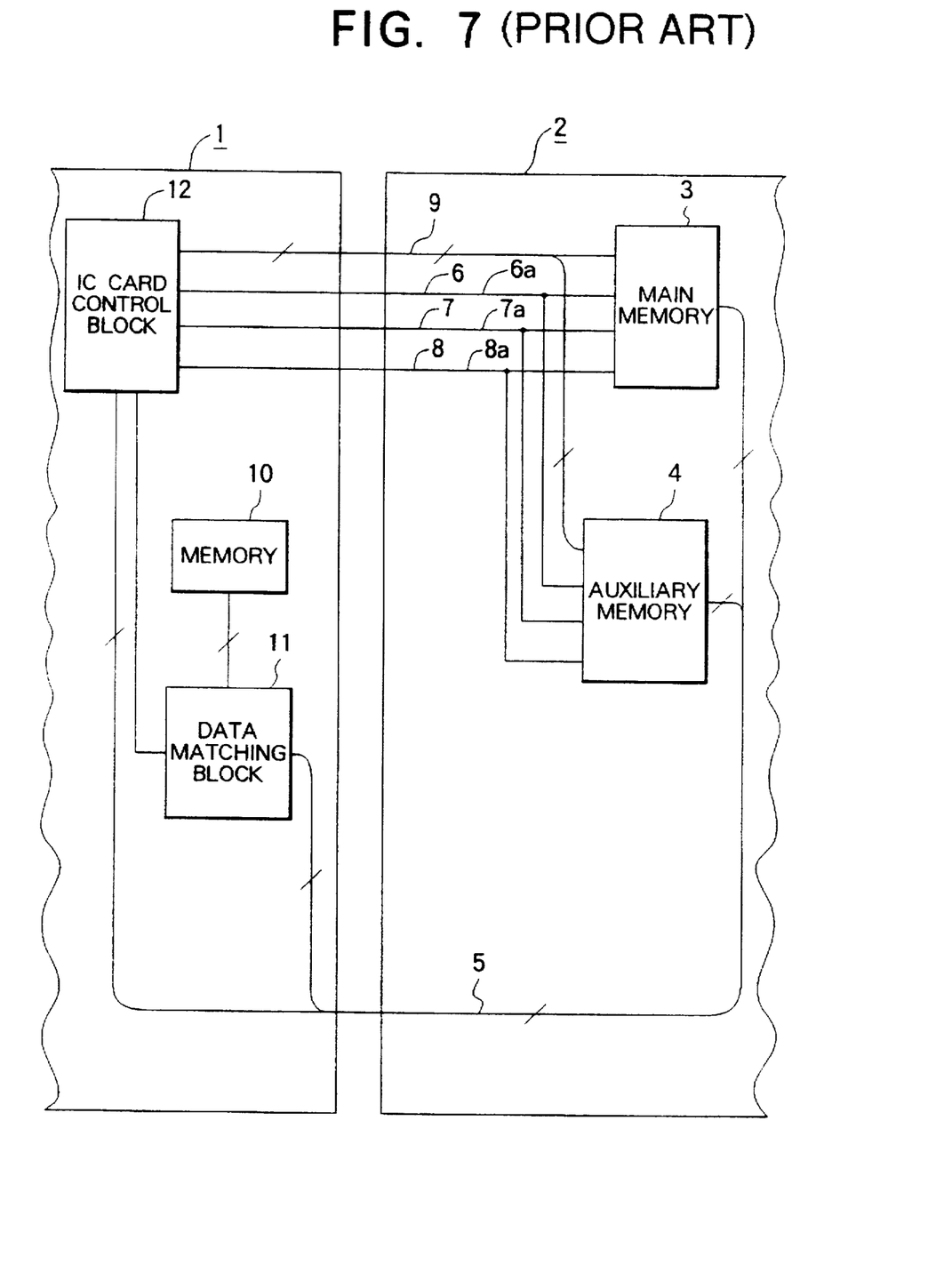
FIG. 7 is a fragmentary block diagram showing a privately known IC card and its host system.

FIG. 7 is a block diagram showing a known IC card system composed of an IC card and its host system. Shown in FIG. 7 are a host system 1 and an IC 2 card connected to the host system 1 via connectors (not shown) or the like. The IC card 2 has a main memory 3 and an auxiliary memory 4. The auxiliary memory 4 stores identification data for identifying the IC card 2, for example a manufacturer's name, the type of the card (memory card, I/O card or the like), access time, capacity, and the identification code for the IC card 2 as necessary. The host system 1 comprises a memory 10 for storing a diversity of data, a data matching block 11, and an IC card control block 12 which is connected the data matching block 11 for controlling the operation of IC card 2. The IC card control block 12 is connected to the main memory 3 and the auxiliary memory 4 via an address bus 9 and a plurality of signal lines, namely, a card enable signal line 6, a memory select signal line 7 and a read/write control signal line 8. The data matching block 11 is connected to the auxiliary memory 4 in the IC card 2 via a data bus 5.

The card enable signal 6a which is transmitted through the card enable line 6 selects which card 2 to access when two IC cards 2 are inserted into or connected to the host system 1. A single card 2 only is inserted in FIG. 7, and thus the card enable signal 6 is at a low (L) level because no selection is required. The read/write control signal 8a which is transmitted through the read/write control signal line 8 control reading from and writing to the main memory 3 and auxiliary 4 in the IC card 2. The read/write control signal at its high (H) level represents a reading instruction. At its low (L) level, the read/write control signal represents a write instruction. The memory select signal 7a which is transmitted through the memory select signal line 7 selects which memory to access, the main memory 3 or the auxulary memory 4. At its H level, the memory select signal selects the main memory 3, while at its L level the memory select signal selects the auxiliary memory 4.

The operation of the system is now discussed. The host system 1 under the control of the IC card control circuit 12 accesses the auxiliary memory 4 in the IC card 2, checks the IC card 2 for matching according to the identification data in the auxiliary memory 4, and then provides access to the main memory 3. Specifically, the host system 1 drives the card enable signal 6a "L," the read/write control signal 8a "H" indicating a reading instruction, and the memory select signal 7a "L" indicating the selection of the auxiliary memory 4. Then, the host system 1 issues a plurality of address signals over the address bus 9, reads a plurality of data corresponding to the addresses from the auxiliary memory 4, and the matching block 11 checks the plurality of data from the auxiliary memory 4 to see if they match the data stored in the memory 10 in the host system 1. When a match is obtained, the data matching block 11 issues a signal to the IC card control circuit 12, which in turn drives the memory select signal 7a from "L" to "H" to allow access to the main memory. Therefore, unauthorized or unlawful use of the IC card 2 is prevented by making a check at the data matching block 11 to see if the content of the auxiliary memory 4 in the IC card 2 matches the content of the memory 10 in the host system 1.

The known IC card 2 and host system 1 constructed as above prevent unauthorized or unlawful use of the card in this way. When the IC card 2 is standardized and every card contains an identical specification, data in the auxiliary memory 4 may be deciphered, and the data in the IC card 2 may possibly be read, copied, faked or falsified.

SUMMARY OF THE INVENTION

In view of the above problem, the present invention has been developed. It is an object of the present invention to provide an IC card and IC card system in which the IC card is protected from easy copying and unauthorized or unlawful use even when the IC card is standardized and its interface design for external connection has a standardized specification.

According to a first aspect of the present invention, the IC card comprises the main memory for storing general data that are exchanged with a host system, a first matching memory for storing first identification data read from the host system, and second matching memory having read/write capability, which stores temporarily second identification data, and which is read from the host system during matching.

According to a second aspect of the present invention, the IC card has the first matching memory comprising a ROM and the second matching memory comprising a RAM.

According to a third aspect of the present invention, the IC card has the first and second matching memories, both arranged in the same memory area, and write inhibit means for inhibiting writing action onto the first matching memory.

According to a fourth aspect of the present invention, the IC card comprises matching memory control means connected between the host system and the first matching memory, whereby said matching memory control means outputs a read instruction signal to the first matching memory when the matching memory control means receives a predetermined control signal from the host system.

According to a fifth aspect of the present invention, the IC card comprises control counter means connected between the host system and the first matching memory, whereby said control counter means counts a number of times of predetermined control signals provided by the host system and outputs a read instruction signal to the first matching memory when a predetermined count is reached.

According to a sixth aspect of the present invention, the IC card comprises control timer means which outputs a read instruction signal to the first matching memory during a predetermined duration of time, and, after the predetermined duration of time has elapsed, said control timer means outputs a read instruction signal to the second matching memory.

According to a seventh aspect of the present invention, the IC card comprises the main memory for storing general data that are exchanged with the host system, a matching memory for storing identification data read from the host system and checked for matching, control timer means for outputting a first signal for a predetermined duration of time and a second signal after the predetermined duration of time has elapsed, and inversion/non-inversion switching control means connected to both the matching memory and the control timer means, said inversion/non-inversion switching control means inverting and outputting the identification data read from the matching memory during the predetermined duration of time in response to the first signal from the control timer means, and outputting the identification data, as they are, after the predetermined duration of time has elapsed in response to the second signal from the control timer means.

According to an eighth aspect of the present invention, the IC card system comprises: the IC card comprising the main memory for storing general data that are exchanged with the host system, a first matching memory having read-only capability, for storing first identification data read from the host system, and a second matching memory having read/write capability, onto which second identification data are stored by the host system, said second identification data read during check for matching; and the host system comprising a memory for storing data, matching means for reading the first and second identification data respectively from the first and second matching memories for checking individually the first and second identification data against the data stored in the memory for matching, and for issuing a match signal only when both the first and second identification data match the data in the memory, and IC card control means which accesses the IC card and authorizes access to the main memory of the IC card when the match signal is received.

According to a ninth aspect of the present invention, the IC card system comprises: the IC card comprising the main memory for storing general data that are exchanged with the host system, a matching memory for storing identification data the host system reads to check for matching, control timer means for outputting a first signal for a predetermined duration of time and for outputting a second signal after the predetermined duration of time has elapsed, and inversion/non-inversion switching control means connected to both the matching memory and control timer means, for reading the identification data from the matching memory during the predetermined duration of time in response to the first signal from the control timer means and for inverting the identification data before outputting them, for reading the identification data after the predetermined duration of time has elapsed, in response to the second signal from the control timer means and for outputting the identification data without inverting them; and the host system comprising a memory for storing data, matching means which receives the inverted and non-inverted identification data from the inversion/non-inversion switching control means in the IC card, checks individually both identification data against the data stored in the memory for matching, and issues a match signal only when the checking reveals that both identification data match the data in the memory, and IC card control means which accesses the IC card and authorizes access to the main memory of the IC card only when the match signal is received.

In the first and eighth aspects of the present invention, the host system writes data on the entire memory area of the first and second matching memories, updates the content of the second matching memory having write capability, then, reads data of each of the first and second matching memories, checks twice each of the read data against the data stored in the host system, and authorizes itself to read from and write to the main memory of the IC card.

In the seventh and ninth aspects of the present invention, the inversion/non-inversion switching control means inverts and then outputs the content of the matching memory for the predetermined duration of time in response to the signal from the control timer means, and outputs the content of the matching memory without inverting them after the predetermined duration of time has elapsed. The inverted data and non-inverted data are sent to the host system, where both data are checked against the data stored in the host system for matching. The host system authorizes itself to write to and read from the main memory of the IC card only when the checking reveals that both data match the data in the host system.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Embodiment 1

Figure 1:
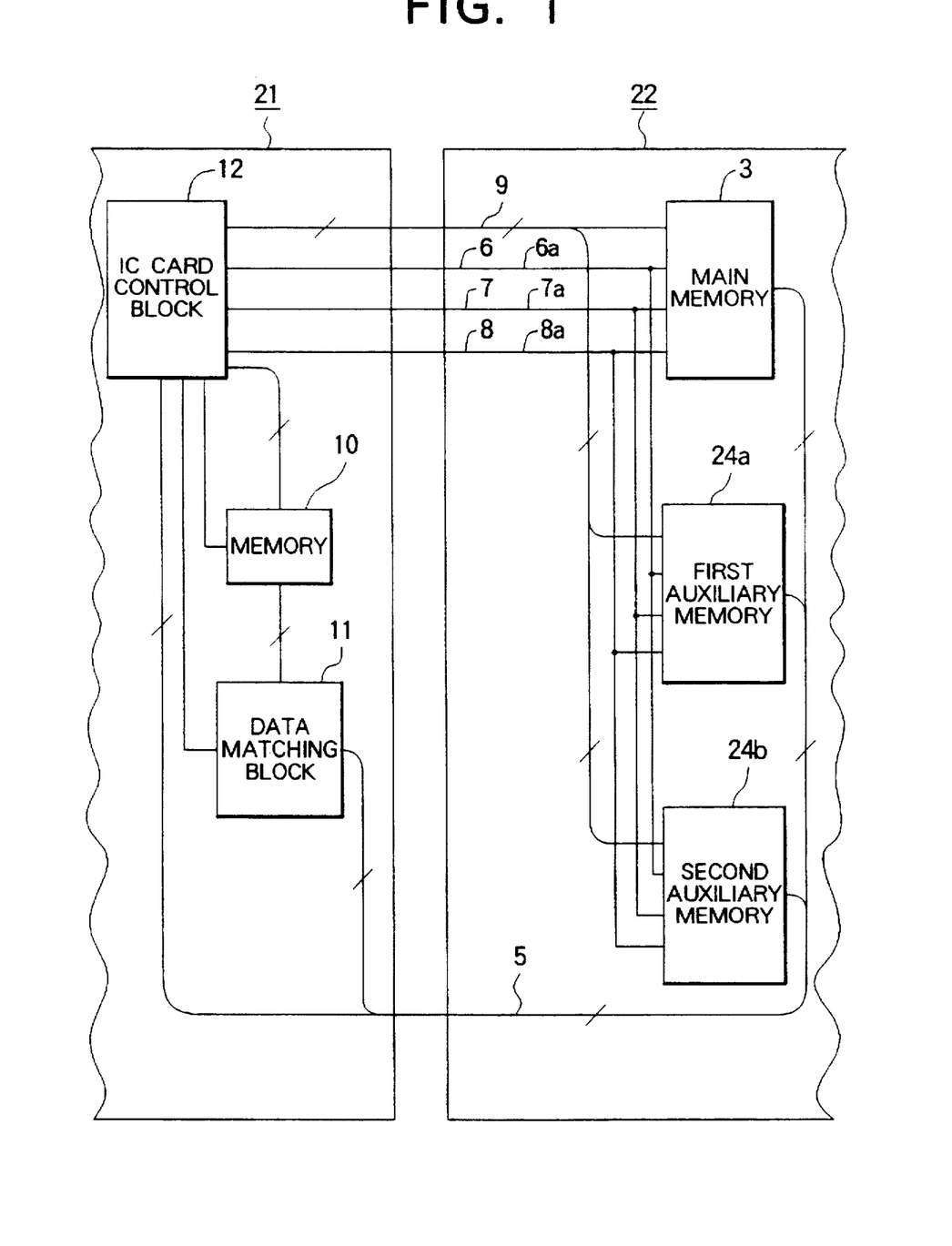
FIG 1. is a fragmentary block diagram showing an IC card and its host system according to embodiment 1 of the present invention.

Referring now to the drawings, a embodiments of the present invention are discussed. FIG. 1 is the block diagram of the IC card system composed of an IC card and its host system according to embodiment 1 of the present invention. In this embodiment, the IC card 22 contains a first auxiliary memory 24a and a second auxiliary memory 24b, which respectively serve as first and second match memories, instead of the auxiliary memory 4 in the known IC card system in FIG. 7. The first auxiliary memory 24a has permanent identification data (first identification data) written in it beforehand, and is a memory of a type having read-only capability such as a ROM. The second auxiliary memory 24b is of a type having read/write capability such as a RAM and into which data (second identification data) to be read by the host system 21 in the checking process are written from the outside. The identification data stored in the first auxiliary memory 24a include, for example, a manufacturer's name of the IC card 22, the type of the card (memory card, I/O card or the like), access time, capacity, and ID code, as necessary. The remaining construction of embodiment 1 is basically the same as the known system in FIG. 7, and the discussion of it is not repeated herein. In this embodiment, the main memory 3 is selected when the memory select signal 7a is at an H level, while both the first and second auxiliary memories 24a, 24b are selected when the memory select signal 7a is at an L level.

The operation of the IC card system is now discussed. First, the case in which the host system 21 checks the IC card 22 is discussed. The host system 21 selects the first and second auxiliary memories 24a, 24b in the IC card 22 by driving the card enable signal 6a low (L level) and the memory select signal 7 low (L level). In succession, the read/write control signal 8a is driven "L" indicative of a write instruction, allowing arbitrary data from among the data in the memory 10 to be written into the entire memory area of the first and second auxiliary memories 24a, 24b, via the address bus 9 and data bus 5. As already mentioned, however, the first auxiliary memory 24a is a read-only type, and no data writing is accepted. Thus, data are written into the second auxiliary memory 24b only, with the content of the first auxiliary memory 24a not updated.

The read/write signal 8a is driven "H", indicative of reading instruction, allowing the host system 21 to read the identification data beforehand written into the first auxiliary memory 24a and the arbitrary data written into the second auxiliary memory 24b. The host system 21 at its data matching block 11 checks both read data against the data in the memory 10 for matching. The data matching block 11 sends a signal to the IC card control circuit 12 only when both the data in the first auxiliary memory 24a and the data in the second auxiliary memory 24b match individually the data in the memory 10. In response, the IC card control circuit 12 drives the memory select signal 7a from low to high, authorizing access to the main memory 3 of the IC card 22. When the data in the first auxiliary memory 24a and data in the second auxiliary memory 24b individually fail to match the data in the memory 10, the host system 21 determines that the IC card 22 is a faked card, and no further access is permitted. Unauthorized or unlawful use of the IC card 22 is thus prevented.

Namely, when a card of a different type such as the known IC card 2 is connected to the host system 21 of the present invention, writing is performed into the entire memory area of the auxiliary memory 4 at the above-mentioned first write operation because the auxiliary memory 4 is a read/write type. This operation updates the addresses in the auxiliary memory 4 corresponding to the first auxiliary memory 24a of the present invention which is free from updating. When the data matching block 11 checks the contents, no match is obtained. As a result, the host system 21 permits no further access, and thus the different card cannot be used.

Assuming that the auxiliary memory 4 of the known IC card 2 is a read-only type, the above-mentioned first write operation shows that the content of addresses corresponding to the second auxiliary memory 24b, of which content can be updated, is not updated. No match is obtained in the checking operation by the data matching block 11, and access to the different type card is thus prevented.

Conversely, if the IC card 22 of the present invention is inserted into a host system of different type, such as the known host system 1 shown in FIG. 7, data are read from the first and second auxiliary memories 24a, 24b and are checked for matching in the data matching block 11. In this case, the first auxiliary memory 24a has the identification data but the second auxiliary memory 24b contains no data. No checking for matching is therefore performed. Thus, access to the main memory 3 of the IC card 22 of the present invention is not authorized. The content of the IC card 22 of the present invention is protected from illegal reading or copying.

According to the IC card 22 and its host system 21 of the present invention, the IC card 22 has the read-only type, first auxiliary memory 24a and read/write type, second auxiliary memory 24b, which serve as auxiliary memories. First, data writing is performed into the entire memory area of the first and second auxiliary memories 24a, 24b, and the content of the second auxiliary memory 24b only is updated. The contents of the first and second auxiliary memories 24a, 24b are checked against the content of the memory 10 in the host system 21 for matching. Access to the main memory 3 in the IC card 22 is authorized only when a match is obtained.

Even if the IC card 22 is standardized with its interface for external connection meeting a standard specification, the content of the IC card 22 is protected from easy coping and unauthorized or unlawful use.

Embodiment 2

Figure 2:
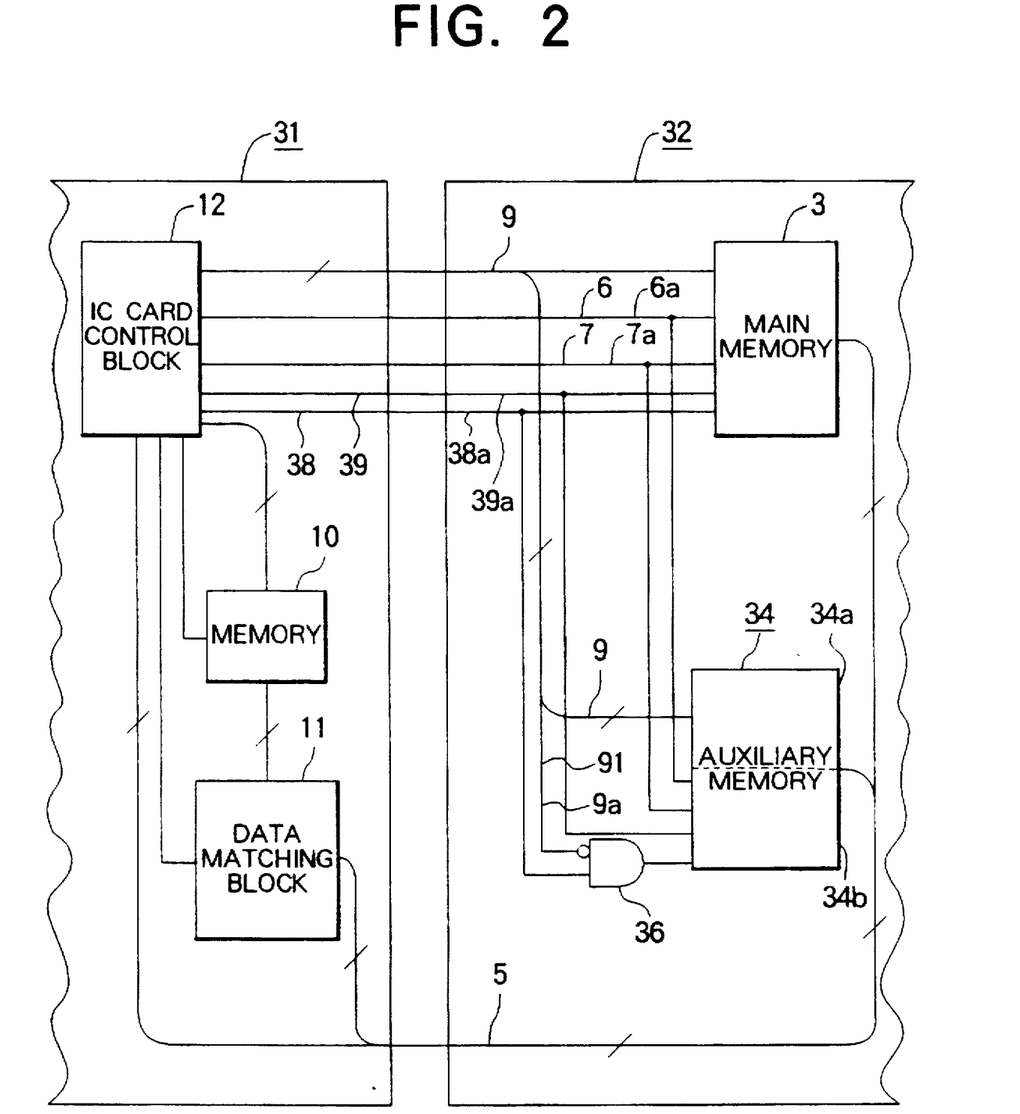
FIG. 2 is a fragmentary block diagram showing an IC card and its host system according to embodiment 2 of the present invention.

FIG. 2 is the block diagram showing an IC card system composed of an IC card and its host system according to embodiment 2 of the present invention. Employed in this embodiment is an auxiliary memory 34 which contains the first and second auxiliary memories 24a, 24b in the first embodiment formed in the common memory area. Namely, the memory area of the auxiliary memory 34 has a first area 34a of read-only type with no data writing capability, into which (permanent) identification data are written through a write control circuit 36 to be explained later, and a second read/write area 34b. The first area 34a is assigned to the upper part of address of the memory area of the auxiliary memory 34. This embodiment uses two signal lines, instead of the read / write control signal line 8, one 39 for transmitting a read signal 39a and the other 38 for transmitting a write signal 38a.

This embodiment employs the write control circuit 36 connected to the auxiliary memory 34 and serving as write inhibit means for inhibiting data writing into the auxiliary memory 34. As shown, the write control circuit 36 is, for example, constructed of an AND gate circuit with one of its two inputs provided with an inverter. An upper address signal line 91 which is connected to one of the signal lines of address bus 9 is fed to the inverter-connected input of the AND gate circuit, and the write signal line 38 is connected to the other input of the AND gate circuit. The upper address signal 9a, which is transmitted through the upper address signal line 91, shifts to an H level (L level) when the address given over the address bus 9 for writing data corresponds to the one in the first area 34a (second area 34b). With the write signal 38a at an H level indicative of writing instruction, the output signal of the write control circuit 36 is driven "H" (active) only when the upper address signal 9a is at an L level, namely only when the second area 34b is addressed. When the upper address signal 9a is at an H level, the first area 34a is addressed, and the output of the write control circuit 36 is at an L level (inactive). As shown, the read signal line 39 is directly connected to the auxiliary memory 34. At its H level, the read signal 39a, which is transmitted through the read signal line 39, indicates a read instruction.

The operation of the system is now discussed. In a case in which the host system 31 checks the IC card 32, the memory select signal 7a is driven low to select the auxiliary memory 34, and the write signal 38a is driven high for the host system 31 to write arbitrary data over the entire memory area of the auxiliary memory 34. As already discussed, however, when the first area 34a is addressed, the upper address signal 9a drives the output of the write control circuit 36 low (inactive), thereby inhibiting data writing.

Next, the read signal 39a is driven high to read the identification data written beforehand into the first area 34a and the arbitrary data written into the second area 34b as above. In the data matching block 11, both read data are checked against the data stored in the memory 10 in the host system 31. The data matching block 11 issues a signal to the IC card control circuit 12 only when both read data individually match the data in memory 10. In response, the IC card control circuit 12 drives the memory select signal 7a high, authorizing access to the main memory 3. When the data in the first area 34a and the data in the second area 34b of the auxiliary memory 34 fail to match individually the data in the memory 10, the host system 31 determines that the IC card 32 is a faked card. The host system 31 accordingly permits no further access. The IC card 32 is thus protected from unauthorized or unlawful use. Therefore, this embodiment has the same advantage as the first embodiment.

Embodiment 3

Figure 3:
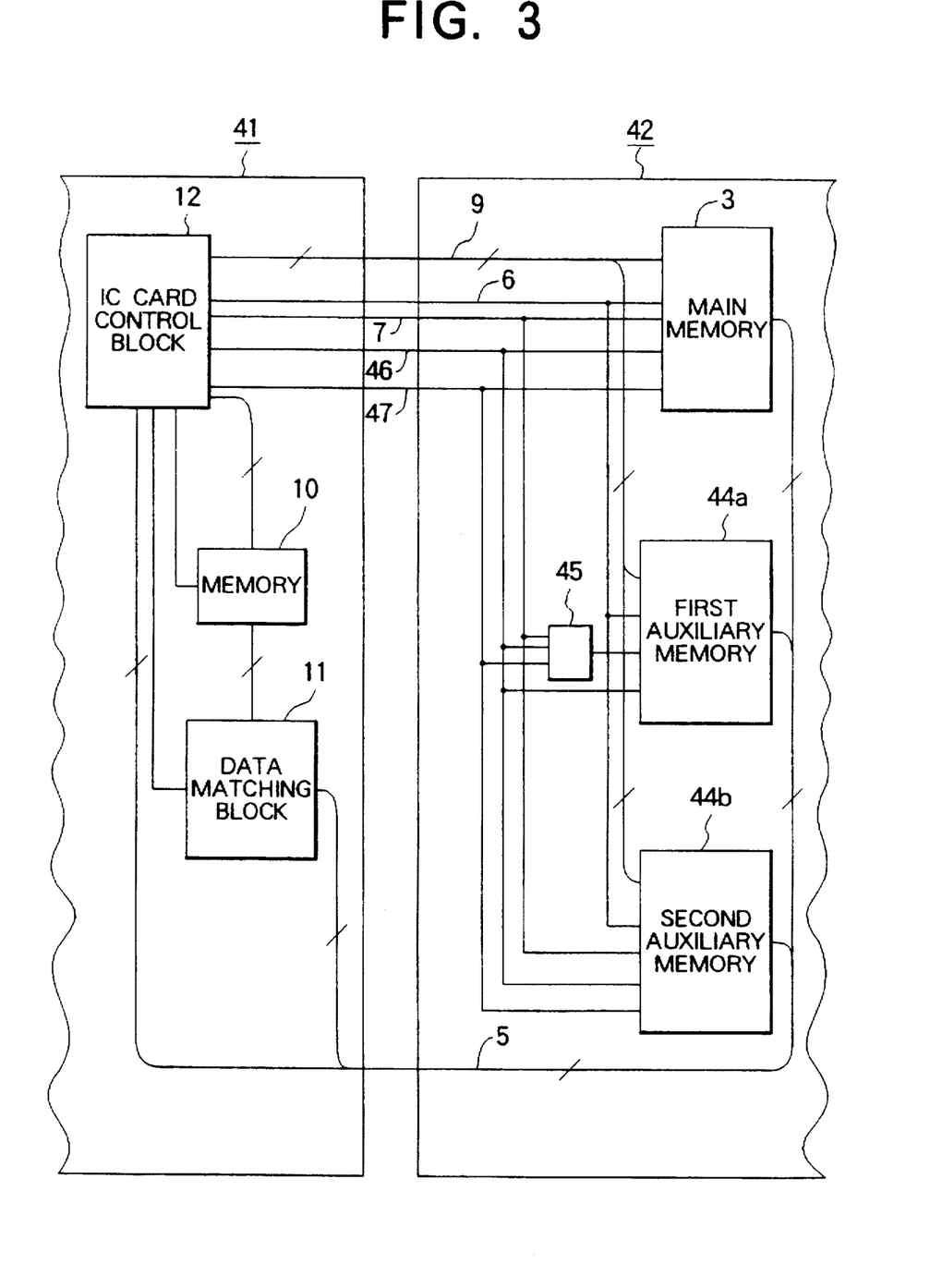
FIG. 3 is a fragmentary block diagram showing an IC card and its host system according to embodiment 3 of the present invention.

FIG. 3 is the block diagram showing an IC card system composed of an IC card and its host system according to embodiment 3 of the present invention. As in the first embodiment, embodiment 3 has a first auxiliary memory 44a and a second auxiliary memory 44b. In this embodiment, the first and second auxiliary memories 44a, 44b have, on the same address, completely different data written in advance before shipment. As in embodiment 2, this embodiment is provided with a read signal line 46 and a write signal line 47. Both the read signal line 46 and write signal line 47 are connected to the first auxiliary memory 44a through an auxiliary control circuit 45 serving as matching memory control means for inhibiting writing into the first auxiliary memory 44a. Also, the read signal line 46 is directly connected to the first auxiliary memory 44a without passing through the auxiliary memory control circuit 45. Both the read signal line 46 and write signal line 47 are directly connected to the second auxiliary memory 44b. In this embodiment, the first auxiliary memory 44a is a read-only type, and the second auxiliary memory 44b is a read/write type.

The operation of the system is now discussed. In a case in which the host system 41 checks the IC card 42, when the memory select signal 7a is driven low, and further a normally nonexistent mode in which both of the read signal 46a and write signal 47a are at an L level is set, the auxiliary memory control circuit 45 selects the first auxiliary memory 44a, thereby allowing data to be read from the first auxiliary memory 44a. The first auxiliary memory 44a has certain data written beforehand as already described. The host system 41 reads the data and checks them against the data in the memory 10 at the data matching block 11. The signal of the normally nonexistent mode serves as a predetermined control signal for selecting the first auxiliary memory 44a and reading the data from it.

When a normally existent mode in which the read signal 46 is at an L level with the write signal 47a at an H level and the memory select signal 7a is driven low, the second auxiliary memory 44b is selected. The host system 41 reads data from the second auxiliary memory 44b, and checks them at the data matching block 11 against the data in the memory 10.

The IC card control circuit 12 authorizes access to the main memory 3 only when the checking confirms that the data in the first auxiliary memory 44a and the data in the second auxiliary memory 44b match individually the data in the memory 10. When the data in the first auxiliary memory 44a and the data in the second auxiliary memory 44b fail to match individually the data in the memory 10, the host system 41 determines that the IC card 42 is a faked one, permitting no further access. The IC card 42 is thus protected from unauthorized or unlawful use.

As already described, this embodiment is provided with the first and second auxiliary memories 44a, 44b which have at identical addresses completely different data written beforehand. First, in response to the password control signal, data are read from the first auxiliary memory 44a. The data in the first auxiliary memory 44a are checked against the data in the memory 10 in the host system 41. Next, the data in the second auxiliary memory 44b are checked against the data in the memory 10 in the host system 41. Since the password control signal, the data in the first auxiliary memory 44a, and the data in the second auxiliary memory 44b are respectively used, the checking process is three-fold one. Therefore, the IC card 42 is even more firmly protected from unauthorized use.

In this embodiment, the first and second auxiliary memories 44a, 44b have at identical addresses completely different data written beforehand. This should not be considered as a requirement. As in the embodiments 1 and 2, first, a write operation may be performed into the first and second auxiliary memories 44a, 44b. The content of the second auxiliary memory 44b of read/write type may be updated, and then the checking process may be performed. Regardless of such a modification, this embodiment offers the same advantage.

Embodiment 4

Figure 4:
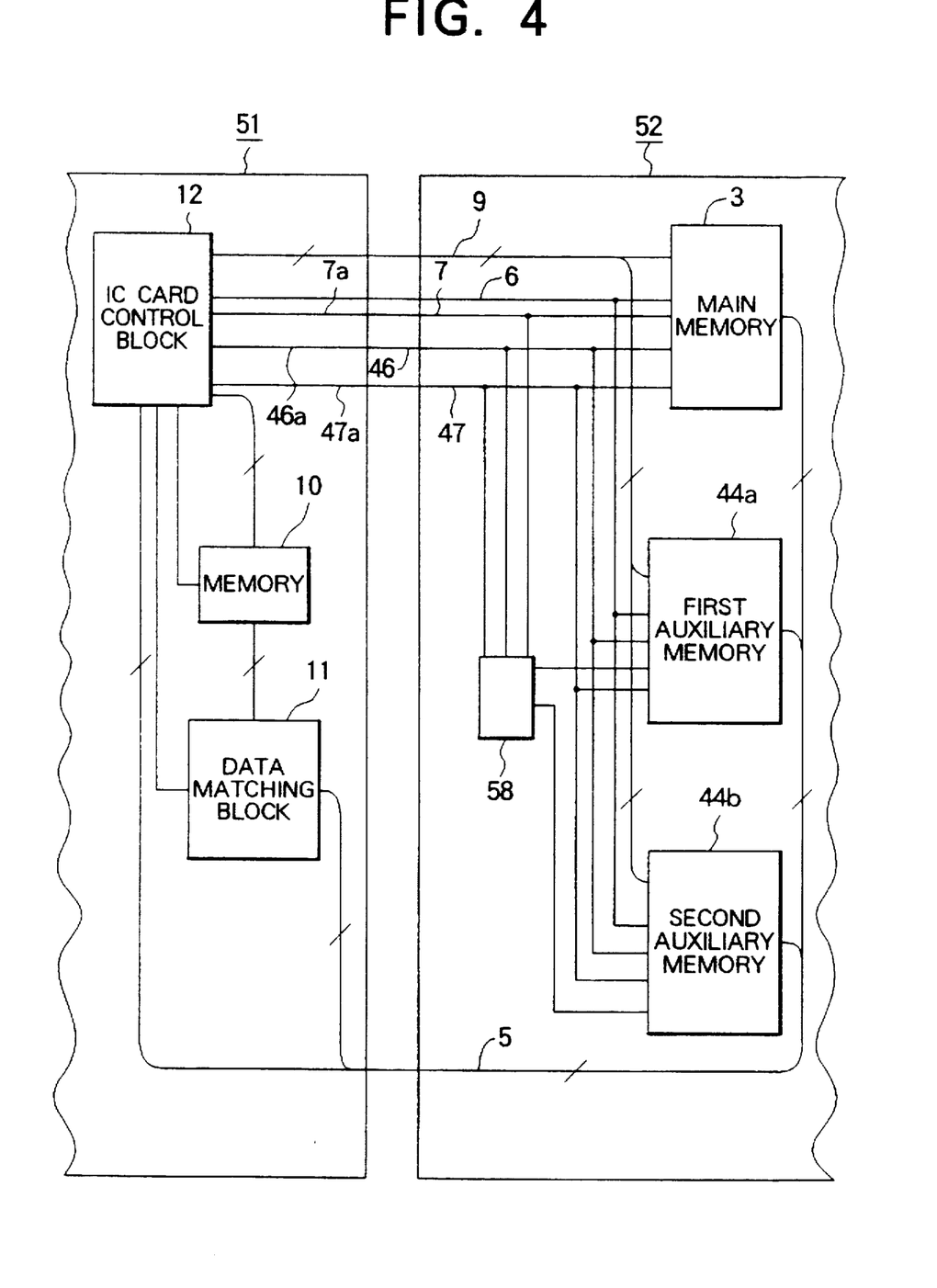
FIG. 4 is a fragmented block diagram showing an IC card and its host system according to the embodiment 4 of the present invention.

FIG. 4 is the block diagram of the IC card 51 and its host system 52 according to embodiment 4 of the present invention. As embodiment 3 does, this embodiment employs the first auxiliary memory 44a of a read-only type and the second auxiliary memory 44b of a read/write type. Both memories 44a, 44b have at identical addresses completely different data written beforehand. This embodiment also employs an auxiliary memory control counter 58 serving as control counter means. The auxiliary memory control counter 58 counts the frequency of occurrences of the normally nonexistent mode serving as the password control signal described with reference to embodiment 3, namely, in which both the read signal 46a and the write signal 47a are at an L level. The first auxiliary memory 44a is selected when a predetermined count is reached.

The operation of the system is now discussed. In a case that the host system 51 checks the IC card 52, when the memory select signal 7a is at an L level, a signal indicative of the normally nonexistent mode that both the read signal 46a and the write signal 47a are at an L level is entered a predetermined number of times, the auxiliary memory control counter 58 selects the first auxiliary memory 44a. As already discussed, certain data are already written into the first auxiliary memory 44a, and the host system 51 reads the data, and checks them by means of the data matching block 11 against the data stored in the memory 10.

When the normally existent mode is entered with the memory select signal 7a at an L level, the second auxiliary memory 44b is selected. The host system 51 reads data from the second auxiliary memory 44b, and checks them in the data matching block 11 against the data in the memory 10 for matching. When the checking reveals that the data in the first auxiliary memory 44a and the data in the second auxiliary memory 44b match individually the data in the memory 10, an access to the main memory 3 of the IC card 52 is authorized. If the data in the first auxiliary memory 44a and the data in the second auxiliary memory 44b fail to match individually the data in memory 10, the host system 51 determines that the IC card 52 is a faked one, permitting no further access. The IC card 52 is thus protected from unauthorized or unlawful use.

As in the embodiment 3, the first and second auxiliary memories 44a, 44b are provided in this embodiment, and two-fold checking is performed. The first checking must be initiated by selecting the first auxiliary memory 44a. To select the first auxiliary memory 44a, however, the password control signal should be entered the predetermined number of times. More security is thus assured to the IC card 52 than in the third embodiment. The IC card 52 is protected from unauthorized use.

In this embodiment, the first and second auxiliary memories 44a, 44b have at identical addresses completely different data written beforehand as in the embodiment 3. This should not be considered as a requirement. As in embodiments 1 and 2, first, a write operation may be performed into the first and second auxiliary memories 44a, 44b. The content of the second auxiliary memory 44b of read/write type may be updated, and then the checking process may be performed. Regardless of such a modification, this embodiment offers the same advantage.

Embodiment 5

Figure 5:
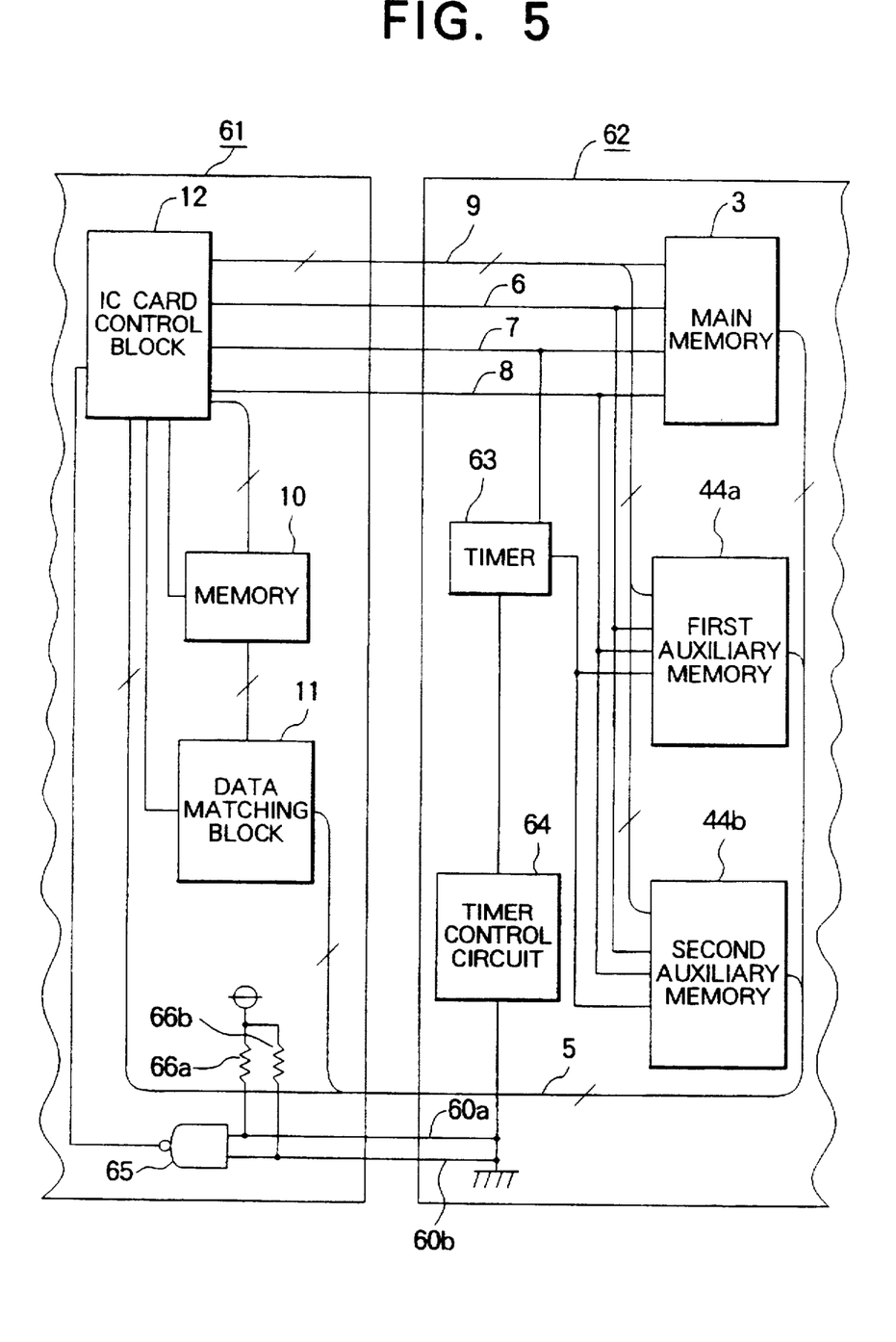
FIG. 5 is a fragmentary block diagram showing an IC card and its host system according to embodiment 5 of the present invention.

FIG. 5 is the block diagram showing the IC card system composed of an IC card and its host system according to embodiment 5 of the present invention. As in which embodiments 3 and 4, this embodiment employs the first auxiliary memory 44a, a read-only type, and the second auxiliary memory 44b, a read/write type, in the IC card 62. Both memories 44a, 44b have at identical addresses completely different data written. In this embodiment, the IC card 62 is provided with a timer 63 and a timer control circuit 64 for controlling the timer 63. The timer 63 is connected to the first and second auxiliary memories 44a and 44b. Both the timer 63 and the timer control circuit 64 constitute control timer means which outputs a read signal to the first auxiliary memory 44a for a predetermined duration and outputs the read signal to the second auxiliary memory 44b after the predetermined duration has elapsed. The output signal line from the timer 63 is commonly shared by the first and second auxiliary memories 44a, 44b, and is at an L signal within the predetermined duration and at an H signal after the predetermined duration has elapsed. This should not be considered as a requirement. Alternatively, two lines may be separately routed to memories 44a, 44b, to conduct the signal and may be switched at the moment of elapse of the predetermined duration.

The host system 61 has an interrupt signal generator circuit 65 that issues an interrupt signal to the IC card control circuit 12. The interrupt signal generator circuit 65 is connected to the timer control circuit 64 via two signal lines 60a, 60b. These two signal lines 60a, 60b conduct an IC card sensor signal, and are provided with pull-up resistors 66a, 66b, respectively. When no IC card 62 is connected to the host system 61, these two signal lines are fixed at an H level. When the IC card 62 is connected, these lines automatically shift to an L level. Also, the interrupt signal generator circuit 65 may be a NAND gate circuit as shown.

The operation of the system is now discussed. When the IC card 62 is inserted into the host system 61, the IC card sensor signal 60a, 60b shifts to an L level, causing the output of the interrupt signal generator 65 to shift to an H level. At the same time, the timer control circuit 64 feeds a control signal to the timer 63. The memory select signal 7a is driven to an L level, which is fed to the timer 63 to trigger it. During a predetermined duration of time (hereinafter referred to as T), the timer 63 continuously outputs an L level signal, causing the first auxiliary memory 44a to be selected. The first auxiliary memory 44a has certain data written beforehand, and the host system 61 reads the data which are checked against the data stored in the memory 10 by the data matching block 11 for matching. At the moment when the duration T has elapsed, the timer 63 issues an H signal. With the memory select signal 7a driven low, then, the second auxiliary memory 44b is selected. The host system 61 reads data from the address of the second auxiliary memory 44b which is identical to that of the first auxiliary memory 44a already read. The data matching block 11 checks the read data against the data stored in the memory 10 for matching. Since both identical addresses of the first and second memories 44a, 44b have completely different data written, the host system 61 reads completely different data from the first auxiliary memory 44a within the duration T and the second auxiliary memory 44b after the duration T has elapsed, though addresses read in both memories 44a, 44b are identical. The host system 61 checks each of the read data with the data in the memory 10. When the host system 61 determines that the data are correct, it authorizes access to the main memory 3 of the IC card 62. If the same data or wrong data are output from the first and second auxiliary memories 44a, 44b during the duration T and after the elapse of the duration T, the host system 61 determines that the IC card 62 is a faked one, thereby permitting no further access. The IC card 62 is thus protected from unauthorized use.

In this embodiment, the first and second auxiliary memories 44a, 44b have at identical addresses completely different data written beforehand as in embodiment 3. This should not be considered as a requirement. As in embodiments 1 and 2, first, a write operation may be performed into the first and second auxiliary memories 44a, 44b. The content of the second auxiliary memory 44b of read/write type may be updated, and then the checking process may be performed. Regardless of such a modification, this embodiment offers the same advantage.

Embodiment 6

Figure 6:
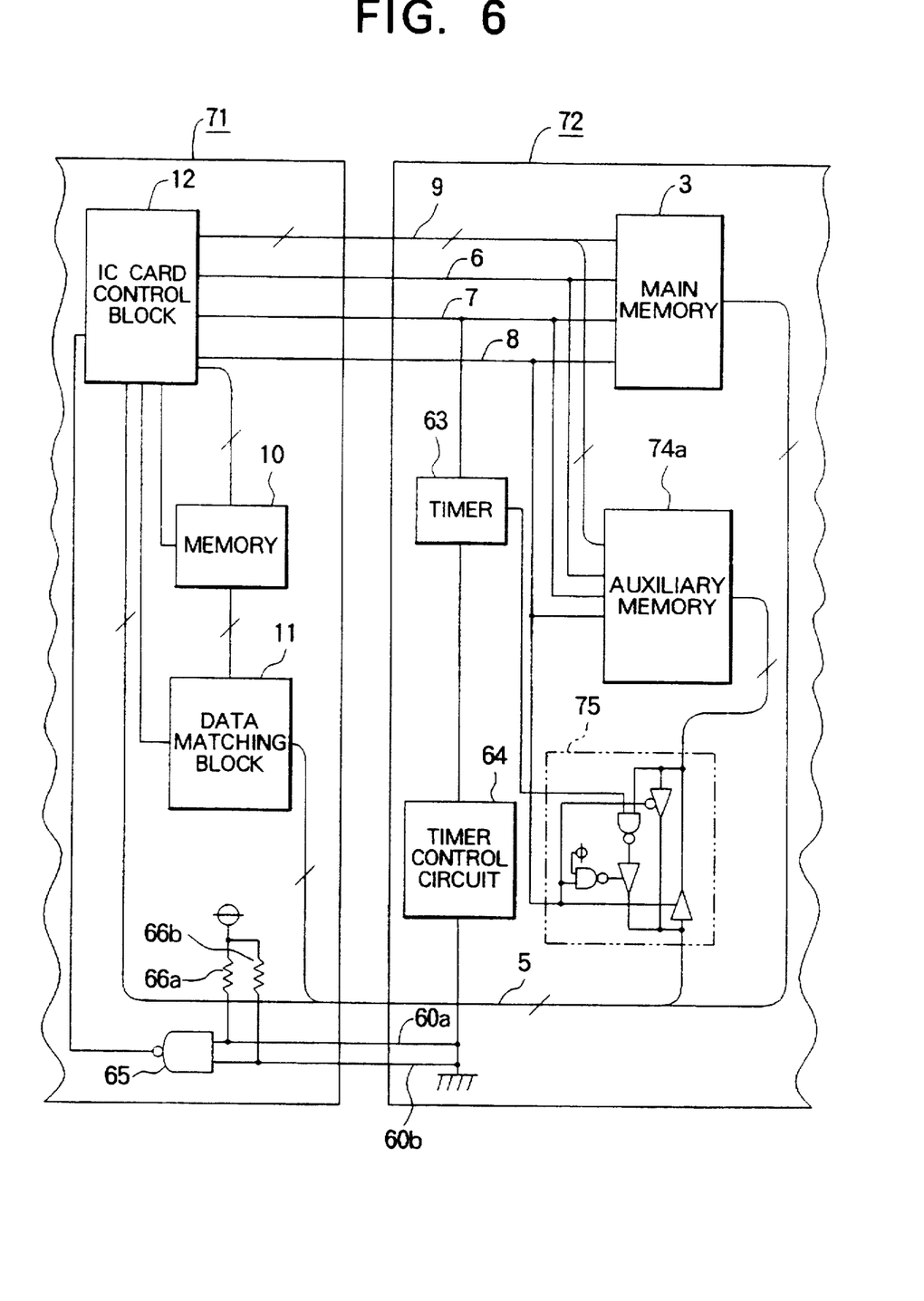
FIG. 6 is a fragmentary block diagram showing an IC card and its host system according to the embodiment 6 of the present invention.

FIG. 6 is the block diagram of an IC card and its host system according to embodiment 6 of the present invention. This embodiment employs a single auxiliary memory 74 serving as a matching memory and to which a data bus input/output control circuit 75 is connected. The data bus input/output control circuit 75 serves as inversion/non-inversion switching control means. In response to the signal from the timer 63, the data bus input/output control circuit 75 outputs an inverted form of the data stored in the auxiliary memory 74 for a predetermined time (hereinafter referred to as T), and outputs a non-inverted form of the data in the auxiliary memory 74 after the elapse of the duration T. The data bus input/output control circuit 75 is constructed of a plurality of NAND gates, for example. The remaining construction of embodiment 6 remains unchanged from embodiment 5, and discussion of it is omitted. Also, the auxiliary memory 74 has certain data written in advance, which serves as identification data in the checking process.

The operation of the system is now discussed. When the IC card 72 is inserted into the host system 71, the IC card sensor signals 60a, 60b that were fixed at an H level by pull-up resistors 66a, 66b are automatically driven low. The interrupt signal generator 65 composed of the NAND gate circuit outputs an H signal. At the same time, the timer control circuit 64 outputs a control signal to the timer 63. Then, with the memory select signal 7a driven low, the auxiliary memory 74 is selected. The memory select signal 7a is also input to the timer 63 to cause it to be initiated. The timer 63 starts working, outputting continuously an H signal for the duration T. The H signal allows the data bus input/output control circuit 75 to give the inverted form of the data output by the auxiliary memory 74. The auxiliary memory 74 has certain data written in advance, and the host system 71 reads the inverted form of the data. The data matching block 11 of the host system 71 checks the read inverted data against the data in the memory 10 for matching.

At the moment the duration T elapses, the timer 63 outputs an L signal, which causes the data bus input/output control circuit 75 to give the non-inverted form of the data from the auxiliary memory 74. The auxiliary memory 74 is selected and the host system 71 reads the non-inverted form of the data stored in the auxiliary memory 74. The data matching block 11 checks the non-inverted data with the data in the memory 10. The host system 71 thus reads the inverted and non-inverted data from the same address in the auxiliary memory 74 during the duration T and after the elapse of the duration T, and determines correctness of the data. Then, the host system 71 authorizes access to the main memory 74 of the IC card 72 when the host system 61 determines that the data are correct. If the same data or wrong data are output from the auxiliary memory 74 in the duration T and after the elapse of the duration T, the host system 71 determines that the IC card 72 is a faked one, thereby permitting no further access. The IC card 72 is thus protected from unauthorized use.

In the first and eighth aspects of the present invention, the host system performs data write on the entire memory area of the first and second matching memories, and updates only the content of the second matching memory of a read/write type. The host system reads the data from the first matching memory and the data from the second matching memory, and checks both data against the data stored in the host system. The host system authorizes read from and write to the main memory of the IC card when the above two-fold checking reveals a match. The IC card having a standardized specification interface is protected from unauthorized and unlawful use, such as copying, falsifying and faking data in the IC card, without losing compatibility and standardized specification.

In the second aspect of the present invention, the first matching memory comprises a ROM, and the second matching memory comprises a RAM. This arrangement simplifies the manufacturing process of the IC card.

In the third aspect of the present invention, the first matching memory and second matching memory are arranged in the shared common memory area. Access to either memory is performed by simply specifying the address of the memory area corresponding to either of two memories. This arrangement facilitates the manufacturing process and then operation of the IC card. The use of inhibit means prevents write operation into the first matching memory. Thus, erroneous update of the content of the first matching memory is prevented.

In the fourth aspect of the present invention, the matching memory control means outputs the read instruction signal to the first matching memory to read data from it, when the host system enters the predetermined control signal. The control signal entry enables reading of the content of the first matching memory. The IC card is even more firmly protected from unauthorized use, because of the three-fold checking process using the control signal entry, the first identification data from the first matching memory, and the second identification data from the second matching memory.

In the fifth aspect of the present invention, the control counter counts the entries of the control signal from the host system. When a predetermined count is reached, the read instruction signal is output to allow the content of the first matching memory to be read. The IC card is even more firmly protected from unauthorized use, because of the four-fold checking process using the control signal entry, the count of entries of the control signal, the first identification data from the first matching memory, and the second identification data from the second matching memory.

In the sixth aspect of the present invention, the control timer means issues the read instruction signal to read the content of the first matching memory for the predetermined duration of time. The host system thus reads the content of the first matching memory. After the predetermined duration of time has elapsed, the control timer means issues the read instruction signal to the second matching memory means, enabling data reading. The host system thus reads the content of the second matching memory. The host system checks both contents for correctness. If the data read in the predetermined duration of time and the data read after the elapse of the predetermined duration of time are found wrong or found identical to each other, the host system inhibits access to the main memory of the IC card. The IC card is thus protected from unauthorized use.

In the seventh and ninth aspect of the present invention, in response to the signal from the timer means, the inversion/non-inversion switching control means outputs the inverted form of the content of the matching memory for the predetermined duration of time, and then outputs the non-inverted form of the content of the matching memory after the predetermined duration of time has elapsed. The host system reads and then checks the inverted and non-inverted data against the data in the host system for matching. Only when the checking process reveals a match, the host system authorizes access to the main memory of the IC card. The checking process is two-fold: the data from the single matching memory is used twice in its inverted form and normal or non-inverted form. This arrangement simplifies the manufacturing process of the IC card, reduces manufacturing cost of the IC card, and prevents unauthorized use at the same time.

What is claimed is:

1. An IC card comprising:
   a main memory for storing data to be transmitted to and received from a host system;
   a read-only first matching memory for storing first identification data to be read and compared by the host system in a checking process; and
   a read/write second matching memory for storing second identification data to be read and compared by the host system in the checking process.

2. The IC card as claimed in claim 1 wherein said first matching memory comprises a ROM and said second matching memory comprises a RAM.

3. The IC card as claimed in claim 1 further comprising write inhibiting means for inhibiting writing of data into said first matching memory, wherein said first and second matching memories are arranged in a common memory area.

4. The IC card as claimed in claim 1 further comprising matching memory control means connected between the host system and said first matching memory for outputting a read-instruction signal to said first matching memory when a predetermined control signal is applied to said first matching memory by the host system.

5. The IC card as aimed in claim 1 further comprising control counter means connected between the host system and said first matching memory for counting reception of control signals from the host system as a count and outputting a read-instruction signal to said first matching memory when the count reaches a predetermined count.

6. The IC card as claimed in claim 1 further comprising control timer means for outputting a read-instruction signal to said first matching memory during a predetermined time period and outputting the read-instruction signal to said second matching memory after the time period has elapsed.

7. An IC card comprising:
   a main memory for storing data to be transmitted to and received from a host system;
   a matching memory for storing identification data to be read and checked for matching by the host system;
   control timer means for outputting a first signal for a predetermined duration and outputting a second signal after the predetermined duration has elapsed; and
   inversion/non-inversion switching control means, connected to said matching memory and said control timer means, for inverting the identification data read from said matching memory and outputting the identification data after inversion to the host system during the predetermined duration in response to the first signal from said control timer means, and for outputting the identification data without inversion to the host system after the predetermined duration has elapsed in response to the second signal from said control timer means.

8. An IC card system comprising:
   an IC card comprising:
     a main memory for storing data to be transmitted to and received from a host system;
     a read-only first matching memory for storing first identification data to be read by the host system; and
     a read/write second matching memory into which second identification data are written by the host system; and
   a host system comprising:
     a host memory for storing data to be transmitted to and data received from said IC card;
     matching means for reading the first and second identification data from said first and second matching memories, for individually comparing the first and second identification data to the data stored in said host memory, and for outputting a match signal when both the first and second identification data match the data in said host memory ; and
     IC card control means for permitting writing into and reading from said main memory of said IC card only when the match signal is received from said matching means.

9. The IC card system as claimed in claim 8, wherein said first matching memory of said IC card comprises a ROM and said second matching memory of said IC card comprises a RAM.

10. The IC card system as claimed in claim 8, wherein said first and second matching memories of said IC card are arranged in a common memory area, and said IC card comprises write inhibiting means for inhibiting writing into said first matching memory.

11. The IC card system as claimed in claim 8 further comprising matching memory control means in said IC card and connected between said host system and said first matching memory for outputting a read-instruction signal to said first matching memory when said matching memory control means receives a control signal from said host system.

12. The IC card system as claimed in claim 8 further comprising control counter means in said IC card and connected between said host system and said first matching memory for counting reception of control signals from said host system as a count and outputting a read-instruction signal to said first matching memory when the count reaches a predetermined count.

13. The IC card system as claimed in claim 8 further comprising control timer means disposed in said IC card for outputting a read-instruction signal to said first matching memory during a predetermined time period and outputting the read-instruction signal to said second matching memory after the time period has elapsed.

14. An IC card system comprising:
   an IC card comprising:
     a main memory for storing data to be transmitted to and received from a host system;
     a matching memory for storing identification data to be read and checked for matching by the host system;
     control timer means for outputting a first signal for a predetermined duration and outputting a second signal after the predetermined duration has elapsed; and
     inversion/non-inversion switching control means connected to said matching memory and said control timer means for inverting and outputting the identification data read from said matching memory during the predetermined duration in response to the first signal from said control timer means, and outputting the identification data without inversion after the predetermined duration has elapsed in response to the second signal from said control timer means; and
   a host system comprising:
     a host memory for storing data;
     matching means receiving the inverted and non-inverted identification data from said inversion/non-inversion switching control means in said IC card, for comparing individually both the inverted and the non-inverted identification data to data stored in said matching memory and for outputting a match signal when both of the identification data match the data in said host memory; and IC card control means for permitting writing into and reading from said main memory of said IC card only when the match signal is received from said matching means.

* * * * *